United States Patent
Yamazaki et al.

(10) Patent No.: US 9,748,563 B2
(45) Date of Patent: Aug. 29, 2017

(54) ELECTRODE MATERIAL, ELECTRODE PLATE, LITHIUM ION BATTERY, MANUFACTURING METHOD FOR ELECTRODE MATERIAL, AND MANUFACTURING METHOD FOR ELECTRODE PLATE

(71) Applicant: SUMITOMO OSAKA CEMENT CO., LTD., Chiyoda-ku, Tokyo (JP)

(72) Inventors: Akinori Yamazaki, Tokyo (JP); Yoshitaka Yamamoto, Tokyo (JP); Takao Kitagawa, Tokyo (JP); Hirofumi Yasumiishi, Tokyo (JP)

(73) Assignee: SUMITOMO OSAKA CEMENT CO., LTD. (JP)

(*) Notice: Subject to any disclaimer, the term of this patent is extended or adjusted under 35 U.S.C. 154(b) by 6 days.

(21) Appl. No.: 14/374,032

(22) PCT Filed: Jan. 22, 2013

(86) PCT No.: PCT/JP2013/051222
§ 371 (c)(1),
(2) Date: Jul. 23, 2014

(87) PCT Pub. No.: WO2013/115013
PCT Pub. Date: Aug. 8, 2013

(65) Prior Publication Data
US 2015/0118558 A1 Apr. 30, 2015

(30) Foreign Application Priority Data
Jan. 31, 2012 (JP) .................................. 2012-018112

(51) Int. Cl.
*H01M 4/36* (2006.01)
*H01M 4/13* (2010.01)
(Continued)

(52) U.S. Cl.
CPC ............. *H01M 4/366* (2013.01); *C01B 25/45* (2013.01); *H01M 4/0402* (2013.01);
(Continued)

(58) Field of Classification Search
CPC ............. H01M 4/0402; H01M 4/0404; H01M 4/0471; H01M 4/133; H01M 4/136;
(Continued)

(56) References Cited

U.S. PATENT DOCUMENTS 7,390,473 B1 * 6/2008 Singhal et al. ............... 423/306
2004/0033360 A1 * 2/2004 Armand et al. ............... 428/408
(Continued)

FOREIGN PATENT DOCUMENTS

CA 2614634 A1 6/2009
CN 102225753 A 10/2011
(Continued)

OTHER PUBLICATIONS

"Factors Influencing the Quality of Carbon Coatings on LiFePO4", Wilcox et al., Journal of The Electrochemical Society, 154 (5), A389-A395, 2007.*
(Continued)

*Primary Examiner* — Kenneth Douyette
(74) *Attorney, Agent, or Firm* — Merchant & Gould P.C.

(57) ABSTRACT

An electrode material of the present invention includes surface-coated $Li_xA_yD_zPO_4$ particles obtained by coating surfaces of $Li_xA_yD_zPO_4$ (in which, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq 2$, $0<y\leq 1$, and $0\leq z\leq 1.5$) particles with a carbonaceous coat, and an elution amount of Li is in a range of 200 ppm to 700 ppm and an elution amount of P is in a range of 500 ppm to 2000 ppm when the (Continued)

surface-coated $Li_xA_yD_zPO_4$ particles are immersed in a sulfuric acid solution having a hydrogen-ion exponent of 4 for 24 hours.

3 Claims, 2 Drawing Sheets

(51) Int. Cl.

| | |
|---|---|
| H01M 4/58 | (2010.01) |
| C01B 25/45 | (2006.01) |
| H01M 4/136 | (2010.01) |
| H01M 4/04 | (2006.01) |
| H01M 4/133 | (2010.01) |
| H01M 4/1391 | (2010.01) |
| H01M 4/587 | (2010.01) |
| H01M 4/62 | (2006.01) |
| H01M 4/1397 | (2010.01) |
| H01M 10/0525 | (2010.01) |
| H01M 4/02 | (2006.01) |

(52) U.S. Cl.
CPC ....... *H01M 4/0404* (2013.01); *H01M 4/0471* (2013.01); *H01M 4/133* (2013.01); *H01M 4/136* (2013.01); *H01M 4/1391* (2013.01); *H01M 4/1397* (2013.01); *H01M 4/587* (2013.01); *H01M 4/5825* (2013.01); *H01M 4/625* (2013.01); *H01M 10/0525* (2013.01); *H01M 2004/021* (2013.01)

(58) Field of Classification Search
CPC .. H01M 4/1391; H01M 4/1397; H01M 4/366; H01M 4/587; H01M 4/5825; H01M 10/0525
See application file for complete search history.

(56) References Cited

U.S. PATENT DOCUMENTS

| | | | | |
|---|---|---|---|---|
| 2006/0127767 A1* | 6/2006 | Gauthier et al. | ............. | 429/221 |
| 2008/0248391 A1* | 10/2008 | Wakasugi | ............. | B82Y 30/00 429/223 |
| 2009/0087660 A1* | 4/2009 | Suzuki | ............. | C01B 25/45 428/403 |
| 2009/0183650 A1* | 7/2009 | Doeff et al. | ............. | 106/286.2 |
| 2010/0233538 A1* | 9/2010 | Nesper | ............. | H01M 4/136 429/217 |
| 2010/0297496 A1 | 11/2010 | Ravet et al. | | |
| 2010/0304217 A1 | 12/2010 | Suzuki et al. | | |
| 2010/0323245 A1* | 12/2010 | Liang | ............. | 429/231.5 |
| 2011/0210293 A1* | 9/2011 | Liang et al. | ............. | 252/506 |
| 2013/0095390 A1 | 4/2013 | Geoffroy et al. | | |

FOREIGN PATENT DOCUMENTS

| | | |
|---|---|---|
| JP | A-2001-015111 | 1/2001 |
| JP | A-2004-014340 | 1/2004 |
| JP | A-2004-014341 | 1/2004 |
| JP | A-2004-259471 | 9/2004 |
| JP | A-2005-093158 | 4/2005 |
| JP | A-2006-032241 | 2/2006 |
| JP | A-2008-311067 | 12/2008 |
| JP | A-2009-038013 | 2/2009 |
| JP | A-2009-048958 | 3/2009 |
| JP | A-2009-081002 | 4/2009 |
| JP | A-2010-508234 | 3/2010 |
| JP | A-2010-244723 | 10/2010 |
| JP | A-2011-082133 | 4/2011 |
| JP | A-2011-103305 | 5/2011 |
| JP | A-2011-181427 | 9/2011 |
| WO | WO 2011/091525 A1 | 8/2011 |
| WO | WO 2012/150636 A1 | 11/2012 |

OTHER PUBLICATIONS

International Search Report for corresponding International Patent Application No. PCT/JP2013/051222 (mailed Apr. 23, 2013).
Japanese Office Action for corresponding Japanese Patent Application No. 2012-018112 (mailed Oct. 14, 2014).
Japanese Office Action for corresponding Japanese Patent Application No. 2012-018112 (mailed Mar. 10, 2015).
European Search Report for corresponding European Patent Application No. 13744379.2 (mailed Sep. 28, 2015).
European Office Action for corresponding European Patent Application No. 13744379.2 (mailed Jul. 29, 2016).

* cited by examiner

ELECTRODE MATERIAL, ELECTRODE PLATE, LITHIUM ION BATTERY, MANUFACTURING METHOD FOR ELECTRODE MATERIAL, AND MANUFACTURING METHOD FOR ELECTRODE PLATE

This application is a U.S. National Stage Application under 35 U.S.C. §371 of International Patent Application No. PCT/JP2013/051222 filed 22 Jan. 2013, which claims the benefit of priority to Japanese Patent Application No. 2012-018112 filed 31 Jan. 2012, the disclosures of all of which are hereby incorporated by reference in their entireties. The International Application was published in Japanese on 8 Aug. 2013 as WO 2013/115013.

TECHNICAL FIELD

The present invention relates to an electrode material, an electrode plate, a lithium ion battery, a manufacturing method for an electrode material, and a manufacturing method for an electrode plate, and particularly to an electrode material and an electrode plate that are preferably used for a positive electrode for a lithium ion battery, a lithium ion battery including the above-described electrode plate, a manufacturing method for an electrode material, and a manufacturing method for an electrode plate.

BACKGROUND

Along with the recent rapid progress in the development of clean energy techniques, progress has also been made regarding techniques seeking for an earth-friendly society through reduction of petroleum dependency, zero emissions, distribution of power-saving products and the like. Particularly, an item that has recently attracted attention is a secondary battery used for an electric vehicle, a high-capacity storage battery capable of supplying energy in case of an accidental disaster, a portable electronic device and the like. For example, a lead storage battery, an alkali storage battery, a lithium ion battery and the like are known.

Particularly, a decrease in size and weight and an increase in capacity are possible in a lithium ion battery that is a non-aqueous electrolytic solution secondary battery. Furthermore, due to excellent characteristics such as high output and high energy density, the lithium ion battery has been commercialized as a high-output power supply not only for an electric vehicle but also for an electric power tool, and the development of a material for a next-generation lithium ion battery is being actively carried out across the globe.

In addition, recently, a home energy management system (HEMS) has been developed as a collaboration of an energy technique and a house, and a system that manages the optimization of automatic control and electric power supply and demand by integrating information concerning home electricity such as smart home appliances, electric vehicles or solar power generation and a control system, and efficiently consumes energy has been attracting attention.

Meanwhile, $LiCoO_2$ and $LiMnO_2$ are generally used as an active material for a positive electrode material of a lithium ion battery in current use. However, since Co is eccentrically present in the earth, and is a rare resource, considering the large amount of Co necessary as a positive electrode material and the like, there are concerns that the manufacturing costs may increase in a case in which Co is used to produce a product and a stable supply may be difficult. Therefore, as an alternative positive electrode-active material of $LiCoO_2$, research and development are being actively carried out regarding a positive electrode-active material such as $LiMn_2O_4$ having a spinel crystal structure, $LiNi_{1/3}Mn_{1/3}CO_{1/3}O_2$ having a ternary material composition, lithium iron oxide ($LiFeO_2$) or lithium iron phosphate ($LiFePO_4$) that is an iron-based compound.

Among the above-described positive electrode-active materials, $LiFePO_4$ having an olivine structure has been attracting attention as a positive electrode-active material having no problems with not only safety but also resource and cost.

An olivine-based positive electrode-active material represented by $LiFePO_4$ contains phosphorous as a constituent element and has a strong covalent bond with oxygen, and therefore, compared with a positive electrode-active material such as $LiCoO_2$, there is no case in which oxygen is emitted at a high temperature, there is no concern of a risk of ignition due to the oxidation decomposition of an electrolytic solution, and the safety is excellent.

However, even in $LiFePO_4$ having the above-described advantages, there is a problem of low electron conductivity. The reason for the low electron conductivity is considered to be slow diffusion of lithium ions in the electrode-active material derived from the structure and the low electron conducting property.

Therefore, as an electrode material having improved electron conductivity, for example, an electrode material for which a plurality of primary particles including a formula $Li_xA_yD_zPO_4$ (here, A represents at least one selected from Cr, Mn, Fe, Co, Ni and Cu, D represents at least one selected from Mg, Ca, Sr, Ba, Ti, Zn, B, Al, Ga, In, Si, Ge, Sc, Y and rare earth elements, $0<x\leq2$, $0<y\leq1.5$, and $0\leq z\leq1.5$) is collected so as to produce secondary particles and an electron-conducting substance such as carbon is interposed between the primary particles and a manufacturing method therefor (PTL 1, 2 and the like), an electrode material in which a conductive carbonaceous material is uniformly deposited on the surface of a complex oxide containing a transition metal or a non-transition metal (PTL 3), a positive electrode material including a complex of $LiFePO_4$ and carbon (PTL 4), a positive electrode-active material for which a lithium-containing phosphoric acid salt having an olivine structure is used (PTL 5), and the like have been proposed.

In addition, as an electrode material having high capacity and an excellent charging and discharging cycle, a positive electrode-active material in which at least one of sulfur (S), phosphorous (P) and fluorine (F) are agglomerated on the surfaces of complex oxide particles containing lithium (PTL 6), a manufacturing method for an active material in which an active material of a lithium secondary battery or Fe impurities in a raw material that composes an active material is removed using a magnetic force (PTL 7), and the like have been also proposed.

CITATION LIST

Patent Literature

[PTL 1] Japanese Laid-open Patent Publication No. 2004-014340
[PTL 2] Japanese Laid-open Patent Publication No. 2004-014341
[PTL 3] Japanese Laid-open Patent Publication No. 2001-015111
[PTL 4] Japanese Laid-open Patent Publication No. 2006-032241

[PTL 5] Japanese Laid-open Patent Publication No. 2009-048958

[PTL 6] Japanese Laid-open Patent Publication No. 2011-082133

[PTL 7] Japanese Laid-open Patent Publication No. 2009-038013

SUMMARY OF INVENTION

Technical Problem

However, in the electrode materials of PTL 1 to 5, while it was certain that the initial capacity improved, there was a problem with the maintenance of a charged state for a long period of time or a battery capacity deteriorating in terms of the cycle characteristics of charging and discharging the battery repeatedly. Therefore, for these electrode materials, there was a demand for improvement of durability.

Meanwhile, in the positive electrode-active material of PTL 6, since at least one of sulfur (S), phosphorous (P) and fluorine (F) are agglomerated on the surfaces of complex oxide particles, while the durability improved, there was a disadvantage in that the added compound generated gas so as to expand the battery or the compound coated the surface of the battery so as to impair the conducting property, and therefore the positive electrode-active material is not considered to be a preferable method for improving durability.

The elution of a metal impurity into an electrolytic solution is considered to be a cause of the above-described deterioration of durability. For example, in a case in which a metal impurity elutes into an electrolytic solution, the metal impurity electro-crystallizes on the surface of the negative electrode, capacity deterioration occurs due to the breakage of a solid electrolyte interphase (SEI) present on the surface of the negative electrode and the subsequent reconfiguration of SEI, the separator breaks, and the battery is short-circuited.

Since the manufacturing method for an active material for a lithium secondary battery of PTL 6 is a method in which an active material or Fe impurities in a raw material that composes an active material are removed using a magnetic force, the manufacturing method is effective for removing a magnetic metallic compound such as iron or nickel. However, it is not possible to remove, for example, a non-magnetic compound such as manganese or an impurity of iron or nickel present in a non-magnetic compound form while iron or nickel is a metallic compound. Furthermore, the method brings about an increase in the manufacturing cost due to complicated manufacturing steps, and thus is not a preferable method.

As described above, in an electrode material for a lithium ion battery of the related art, there was a demand for an additional improvement of the durability of metallic lithium phosphate represented by $LiFePO_4$. To additionally improve the durability, there is a demand for an electrode material in which an elution of a metal impurity causing the deterioration, particularly, an elution of a major element of Fe is suppressed, and, in particular, to improve the durability, it is necessary to suppress an elution of Fe from the positive electrode. However, in a positive electrode material in which a large amount of Fe was eluted, there was a problem in that the durability was poor, positive electrode material-derived Fe eluted into carbon in the negative electrode, and it was not possible to develop sufficient battery characteristics due to the breakage of SEI, the hindered insertion and elimination of Li, and the like.

The invention has been made to solve the above-described problems, and an object of the invention is to provide an electrode material capable of realizing stable charging and discharging cycle characteristics and high durability by suppressing the elution of a metal impurity, particularly, the elution of a major element of Fe into an electrolytic solution or an aqueous solution, an electrode plate, a lithium ion battery, a manufacturing method for an electrode material, and a manufacturing method for an electrode plate.

Solution to Problem

As a result of intensive studies for solving the above-described problems, the present inventors found that, when any one of surface-coated $Li_xA_yD_zPO_4$ particles obtained by coating the surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles with a carbonaceous coat and agglomerated particles obtained by agglomerating a plurality of the surface-coated $Li_xA_yD_zPO_4$ particles are thermally treated in a non-oxidizing atmosphere at a temperature in a range of 40° C. to 500° C. over 0.1 hours to 1000 hours, it is possible to suppress an elution amount of Li in a range of 200 ppm to 700 ppm and an elution amount of P in a range of 500 ppm to 2000 ppm when the surface-coated $Li_xA_yD_zPO_4$ particles or the agglomerated particles are immersed in a sulfuric acid solution having a hydrogen-ion exponent of 4 for 24 hours, and consequently, it is possible to suppress the elution amount of Fe, and completed the invention.

That is, an electrode material of the invention includes surface-coated $Li_xA_yD_zPO_4$ particles obtained by coating surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles with a carbonaceous coat, and an elution amount of Li is in a range of 200 ppm to 700 ppm and an elution amount of P is in a range of 500 ppm to 2000 ppm when the surface-coated $Li_xA_yD_zPO_4$ particles are immersed in a sulfuric acid solution having a hydrogen-ion exponent of 4 for 24 hours.

Another electrode material of the invention includes agglomerated particles obtained by agglomerating a plurality of surface-coated $Li_xA_yD_zPO_4$ particles in which surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles are coated with a carbonaceous coat, and an elution amount of Li is in a range of 200 ppm to 700 ppm and an elution amount of P is in a range of 500 ppm to 2000 ppm when the agglomerated particles are immersed in a sulfuric acid solution having a hydrogen-ion exponent of 4 for 24 hours.

An electrode plate of the invention is obtained by forming a positive electrode material layer containing the electrode material of the invention on a collector.

A lithium ion battery of the invention includes the electrode plate of the invention.

In a manufacturing method for an electrode material of the invention, any one of surface-coated $Li_xA_yD_zPO_4$ particles obtained by coating surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles with a carbonaceous coat and agglomerated particles obtained by agglomerating a plurality of the surface-coated $Li_xA_yD_zPO_4$ particles are thermally treated in a non-oxidizing atmosphere at a temperature in a range of 40° C. to 500° C. over 0.1 hours to 1000 hours.

In a manufacturing method for an electrode plate of the invention, a positive electrode material layer containing any one of surface-coated $Li_xA_yD_zPO_4$ particles obtained by coating surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles with a carbonaceous coat and agglomerated particles obtained by agglomerating a plurality of the surface-coated $Li_xA_yD_zPO_4$ particles is formed on a collector, and then an electrode plate having the positive electrode material layer formed on the collector is thermally treated in a non-oxidizing atmosphere at a temperature in a range of 40° C. to 500° C. over 0.1 hours to 1000 hours.

Advantageous Effects of Invention

According to the electrode material of the invention, since the elution amount of Li is made to be in a range of 200 ppm to 700 ppm and the elution amount of P is made to be in a range of 500 ppm to 2000 ppm when surface-coated $Li_xA_yD_zPO_4$ particles obtained by coating the surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles with a carbonaceous coat or agglomerated particles obtained by agglomerating a plurality of the surface-coated $Li_xA_yD_zPO_4$ particles are immersed in a sulfuric acid solution having a hydrogen-ion exponent of 4 for 24 hours, a compound containing Li and P is adhered to the surfaces of the surface-coated $Li_xA_yD_zPO_4$ particles or the surfaces of the agglomerated particles, and therefore it is possible to suppress the elution of a metal impurity, particularly, the elution of the major element of Fe from the above-described particles.

Therefore, when an electrode plate for a lithium ion battery is produced using the electrode material, the insertion and elimination of Li become favorable in a lithium ion battery, and it is possible to improve the durability of the lithium ion battery.

According to the manufacturing method for an electrode material of the invention, since any one of the surface-coated $Li_xA_yD_zPO_4$ particles obtained by coating surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles with a carbonaceous coat and the agglomerated particles obtained by agglomerating a plurality of the surface-coated $Li_xA_yD_zPO_4$ particles are thermally treated in a non-oxidizing atmosphere at a temperature in a range of 40° C. to 500° C. over 0.1 hours to 1000 hours, it is possible to easily produce an electrode material capable of suppressing the elution of a metal impurity, particularly, the elution of the major element of Fe.

According to the manufacturing method for an electrode plate of the invention, since the positive electrode material layer containing any one of the surface-coated $Li_xA_yD_zPO_4$ particles obtained by coating surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles with a carbonaceous coat and the agglomerated particles obtained by agglomerating a plurality of the surface-coated $Li_xA_yD_zPO_4$ particles is formed on a collector, and then an electrode plate having the positive electrode material layer formed on the collector is thermally treated in a non-oxidizing atmosphere at a temperature in a range of 40° C. to 500° C. over 0.1 hours to 1000 hours, it is possible to easily produce an electrode plate capable of suppressing the elution of a metal impurity, particularly, the elution of the major element of Fe. Therefore, it is possible to improve the durability of a lithium ion battery by producing the lithium ion battery using the above-described electrode plate.

DESCRIPTION OF EMBODIMENTS

Figure 1:
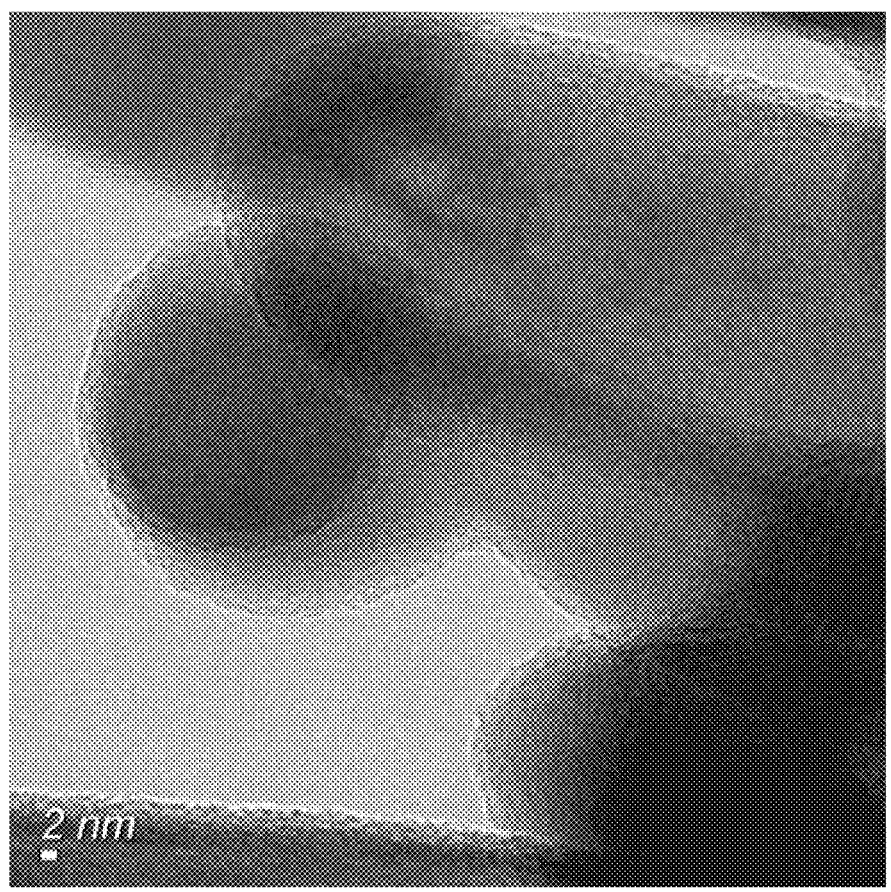
FIG. 1 is a transmission electron microscopic (TEM) photograph of an electrode material (A1) of Example 1.

Embodiments of an electrode material, an electrode plate, a lithium ion battery, a manufacturing method for an electrode material and a manufacturing method for an electrode plate of the invention will be described.

Meanwhile, the embodiments will specifically describe the invention for better understanding of the purport of the invention, and do not limit the invention unless otherwise described.

[Electrode Material]

An electrode material of the present embodiment is an electrode material including any one of the following (1) and (2).

(1) Surface-coated $Li_xA_yD_zPO_4$ particles obtained by coating the surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles with a carbonaceous coat in which the elution amount of Li is in a range of 200 ppm to 700 ppm, and preferably in a range of 300 ppm to 600 ppm, and the elution amount of P is in a range of 500 ppm to 2000 ppm, and preferably in a range of 1000 ppm to 1500 ppm when the surface-coated $Li_xA_yD_zPO_4$ particles are immersed in a sulfuric acid solution having a hydrogen-ion exponent (pH) of 4 for 24 hours.

(2) Agglomerated particles obtained by agglomerating a plurality of surface-coated $Li_xA_yD_zPO_4$ particles in which surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles are coated with a carbonaceous coat in which the elution amount of Li is in a range of 200 ppm to 700 ppm, and preferably in a range of 300 ppm to 600 ppm, and the elution amount of P is in a range of 500 ppm to 2000 ppm, and preferably in a range of 1000 ppm to 1500 ppm when the agglomerated particles are immersed in a sulfuric acid solution having a hydrogen-ion exponent (pH) of 4 for 24 hours.

In the above-described (1) and (2), x is more preferably $0.7\leq x\leq1.3$. y is more preferably $0.7\leq y\leq1.0$. z is more preferably $0\leq z\leq0.5$. In addition, in the invention, a plurality refers to an integer of 2 or more, and may be, for example, 2 to 1000, 2 to 500, 2 to 100, 2 to 10, and the like.

Meanwhile, the electrode material (2) is different from the electrode material (1) only in terms of the fact that the electrode material (2) is "agglomerated particles obtained by agglomerating a plurality of surface-coated $Li_xA_yD_zPO_4$ particles", and both materials are the same in terms of all the other properties.

Here, the electrode material (1) will be described, and, for the electrode material (2), only the differences from the electrode material (1) will be described as appropriate.

Regarding $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$), which is a major component of the surface-coated $Li_xA_yD_zPO_4$ particles, A is preferably Co, Mn, Ni or Fe, and D is preferably Mg, Ca, Sr, Ba, Ti, Zn and Al in terms of a high discharging potential, a rich resource amount, safety and the like.

Here, the rare earth element refers to 15 elements belonging to the lanthanum series such as La, Ce, Pr, Nd, Pm, Sm, Eu, Gd, Tb, Dy, Ho, Er, Tm, Yb and Lu.

The elution amount of Li and the elution amount of P of the surface-coated $Li_xA_yD_zPO_4$ particles or the agglomerated particles can be obtained in a manner in which the particles are injected and stirred in a sulfuric acid solution having a mass that is 10 times the mass of the particles and a pH of 4 and having been held at 25° C., are immersed at 25° C. for 24 hours, and, after the 24 hours, the elution amount of Li and the elution amount of P eluted from the particles into the sulfuric acid solution are measured.

For the measurement of the elution amount of Li and the elution amount of P, inductively coupled plasma spectrometry (IPC spectrometry) is preferable since the detection sensitivity is high and high-sensitivity multi-element simultaneous quantification is possible.

Here, the reason for limiting the elution amount of Li in a range of 200 ppm to 700 ppm is that the above-described range is a range indicating that Li is favorably adhered to the surfaces of the surface-coated $Li_xA_yD_zPO_4$ particles or the surfaces of the agglomerated particles.

Here, in a case in which the elution amount of Li is less than 200 ppm, the adhered amount of Li on the surfaces of the surface-coated $Li_xA_yD_zPO_4$ particles or the surfaces of the agglomerated particles decreases, and therefore it becomes impossible to suppress the elution of a metal impurity, particularly, the elution of a major element of Fe from the particles. On the other hand, in a case in which the elution amount of Li exceeds 700 ppm, the adhered amount of Li on the surfaces of the surface-coated $Li_xA_yD_zPO_4$ particles or the surfaces of the agglomerated particles increases, the thickness of a Li film covering the surfaces of the particles becomes too thick, consequently, in a case in which the electrode material is applied to a lithium ion battery, the insertion and elimination of Li is hindered, and it becomes impossible to develop sufficient charging and discharging characteristics.

The reason for limiting the elution amount of P in a range of 500 ppm to 2000 ppm is that, similarly to the elution amount of Li, the above-described range is a range indicating that P is favorably adhered to the surfaces of the surface-coated $Li_xA_yD_zPO_4$ particles or the surfaces of the agglomerated particles.

Here, in a case in which the elution amount of P is less than 500 ppm, the adhered amount of P on the surfaces of the surface-coated $Li_xA_yD_zPO_4$ particles or the surfaces of the agglomerated particles decreases. Therefore, it becomes impossible to suppress the elution of a metal impurity, particularly, the elution of a major element of Fe from the particles. On the other hand, in a case in which the elution amount of P exceeds 2000 ppm, the adhered amount of P on the surfaces of the surface-coated $Li_xA_yD_zPO_4$ particles or the surfaces of the agglomerated particles increases, and the thickness of a P film covering the surfaces of the particles becomes too thick. As a result, in a case in which the electrode material is applied to a lithium ion battery, the insertion and elimination of Li is hindered, and it becomes impossible to develop sufficient charging and discharging characteristics.

The pH of the solution from which the solid content has been separated is preferably in a range of 7.5 to 10.0 when the elution amount is measured.

An average particle diameter of the primary particles of the surface-coated $Li_xA_yD_zPO_4$ particles can be arbitrarily selected. For example, the average particle diameter is preferably in a range of 0.01 μm to 20 μm, more preferably in a range of 0.015 μm to 12 μm, still more preferably in a range of 0.02 μm to 5 μm, and particularly preferably in a range of 0.05 μm to 1 μm.

Here, the reason for setting the average particle diameter of the primary particles of the surface-coated $Li_xA_yD_zPO_4$ particles in the above-described range is that, when the average particle diameter of the primary particles is less than 0.01 μm, it becomes difficult to sufficiently coat the surfaces of the primary particles with a carbon thin film, the discharge capacity decreases during high-speed charging and discharging, and consequently, it becomes difficult to realize sufficient charging and discharging performance. On the other hand, when the average particle diameter of the primary particles exceeds 20 μm, the internal resistance of the primary particles increases, and consequently, the discharge capacity becomes insufficient during high-speed charging and discharging.

The average particle diameter of the primary particles refers to a volume-average particle diameter. The average particle diameter of the primary particles can be measured using a laser diffraction scattering-type particle size distribution measurement apparatus or the like.

To uniformly cause a reaction in relation to the insertion and elimination of lithium ions across the entire surfaces of the $Li_xA_yD_zPO_4$ particles when the surface-coated $Li_xA_yD_zPO_4$ particles are used as an electrode material for a lithium ion battery, it is preferable to coat 80% or more, and preferably 90% or more of the surfaces of the $Li_xA_yD_zPO_4$ particles with a carbonaceous coat.

A coating ratio of the carbonaceous coat can be measured using a transmission electron microscope (TEM) or an energy-dispersive X-ray spectrometer (EDX). Here, when the coating ratio of the carbonaceous coat is less than 80%, the coating effect of the carbonaceous coat becomes insufficient. Therefore, when an insertion and elimination reaction of lithium ions is caused on the surface of an electrode-active material, the reaction resistance against the insertion and elimination of lithium ions becomes large in places on which the carbonaceous coat is not formed, and the voltage drop in the final phase of discharging becomes significant, which is not preferable.

The thickness of the carbonaceous coat can be arbitrarily selected, but is preferably in a range of 0.1 nm to 20 nm, and preferably in a range of 0.5 nm to 15 nm. The thickness of the carbonaceous coat can be measured using a transmission electron microscope (TEM).

The reason for setting the thickness of the carbonaceous coat in the above-described range is that, when the thickness is less than 0.1 nm, the thickness of the carbonaceous coat is too thin, and therefore there is a case in which it is not possible to form a film having a desired resistance value. As a result, the conducting property degrades, and there is a case in which it becomes impossible to ensure the conducting property suitable for an electrode material. On the other hand, when the thickness exceeds 20 nm, there is a possibility of degradation of the battery activity, for example, the battery capacity of the electrode material per unit mass.

The amount of carbon in the carbonaceous coat is preferably in a range of 0.5 parts by mass to 5 parts by mass, more preferably in a range of 0.8 parts by mass to 3.5 parts by mass, and still more preferably in a range of 1 part by mass to 2 parts by mass with respect to 100 parts by mass of the $Li_xA_yD_zPO_4$ particles.

Here, the reason for limiting the amount of carbon in the carbonaceous coat in the above-described range is that, when the amount of carbon is less than 0.5 parts by mass, the coating ratio of the carbonaceous coat is less than 80%. Therefore, the discharge capacity decreases at a high-speed charging and discharging rate in a formed battery, and there is a case in which it becomes difficult to realize a sufficient charging and discharging rate performance. On the other hand, when the amount of carbon exceeds 5 parts by mass, the $Li_xA_yD_zPO_4$ particles contain a larger amount of carbon than the minimum amount of carbon necessary to form the carbonaceous coat and obtain a conducting property, and there is a possibility that the battery capacity of a lithium ion battery per unit mass of the $Li_xA_yD_zPO_4$ particles may decrease more than necessary.

The shape of the surface-coated $Li_xA_yD_zPO_4$ particles is not particularly limited, but is preferably a spherical shape since it is easy to generate an electrode material including spherical particles, particularly, truly spherical particles. The shape is also preferably a truly spherical shape.

Here, the reason for the spherical shape being preferred is that it is possible to reduce the amount of a solvent when preparing a paste for positive electrode production by mixing the surface-coated $Li_xA_yD_zPO_4$ particles, a binder resin (binding agent) and a solvent, and it also becomes easy to apply the paste for positive electrode production onto a collector. In addition, when the shape is a spherical shape, the surface area of the surface-coated $Li_xA_yD_zPO_4$ particles becomes the minimum. Therefore, it is possible to blend a minimum amount of the binder resin (binding agent) to be added, and it is possible to decrease the internal resistance of a positive electrode to be obtained.

Furthermore, since it becomes easy to closely pack the particles when the shape of the surface-coated $Li_xA_yD_zPO_4$ particles is a spherical shape, particularly, a truly spherical shape, the amount of a positive electrode material to be packed per unit volume increases. As a result, it is possible to increase the electrode density, and it is possible to increase the capacity of a lithium ion battery, which is preferable.

Meanwhile, in a case in which agglomerated particles are produced by agglomerating a plurality of the surface-coated $Li_xA_yD_zPO_4$ particles, an average particle diameter of the agglomerate can be selected depending on the necessity; however, for example, the average particle diameter is preferably in a range of 0.5 µm to 100 µm, more preferably in a range of 2 µm to 20 µm, and particularly preferably in a range of 5 µm to 15 µm. In addition, the average particle diameter may be, for example, in a range of 1 µm to 20 µm or in a range of 1.5 µm to 12 µm. The average particle diameter of the agglomerate is also the number-average particle diameter. The above-described method can be used as a measurement method for the average particle diameter of the agglomerate.

Here, the reason for setting the average particle diameter of the agglomerate in the above-described range is that, when the average particle diameter is less than 0.5 µm, since the agglomerate is too fine, the agglomerate becomes likely to fly away, and it becomes difficult to handle the agglomerate when producing the paste for electrode application. On the other hand, when the average particle diameter exceeds 100 µm, the possibility of the presence of the agglomerate larger than the film thickness of a dried electrode becomes high when producing the electrode for a battery, and therefore it becomes impossible to hold the uniformity of the film thickness of the electrode.

In addition, as other preferred characteristics of the agglomerated particles, the volume-average particle diameter (D50) is preferably in a range of 3 µm to 60 µm, and more preferably in a range of 5 µm to 30 µm. In addition, D10 is preferably in a range of 0 µm to 10 µm, and D90 is preferably in a range of 5 µm to 60 µm.

A volume density of the agglomerate can be measured using a mercury porosimeter, and the volume density of the solid agglomerate is preferably in a range of 40% by volume to 95% by volume, more preferably in a range of 50% by volume to 93% by volume, and still more preferably in a range of 60% by volume to 90% by volume.

As described above, when the volume density of the agglomerate is set to 40% by volume or more, the agglomerate becomes dense so that the strength of the agglomerate increases. For example, the agglomerate does not easily break when the electrode-active material is mixed with a binder, a conduction aid and a solvent, thereby preparing an electrode slurry. As a result, an increase in the viscosity of the electrode slurry is suppressed, and the fluidity is maintained so that applicability becomes favorable, and it is also possible to improve the packing property of the electrode-active material in the coated film of the electrode slurry. In the case of 95% by volume or less, pores inside the agglomerate turn into open pores, in a case in which an electrode for a battery is produced using the agglomerate and the above-described method and the electrode is applied to a lithium ion battery, an electrolytic solution intrudes through the open pores inside the agglomerate so that the diffusion resistance against lithium ions in the agglomerate becomes low, and there is an effect that improves the load characteristics of the battery.

[Manufacturing Method for an Electrode Material]

A manufacturing method for an electrode material of the embodiment is a method in which any one of surface-coated $Li_xA_yD_zPO_4$ particles obtained by coating surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$) particles with a carbonaceous coat and agglomerated particles obtained by agglomerating a plurality of the surface-coated $Li_xA_yD_zPO_4$ particles are thermally treated in a non-oxidizing atmosphere at a temperature in a range of 40° C. to 500° C. over 0.1 hours to 1000 hours.

First, the surface-coated $Li_xA_yD_zPO_4$ particles are produced.

For example, a Li source, a divalent iron salt, a phosphoric acid compound and water are mixed, specifically, a Li source selected from the group consisting of lithium salts such as lithium acetate ($LiCH_3COO$) and lithium chloride (LiCl) and lithium hydroxide (LiOH); a divalent iron salt such as iron (II) chloride ($FeCl_2$), iron (II) acetate (Fe $(CH_3COO)_2$) or iron (II) sulfate ($FeSO_4$); a phosphoric acid compound such as phosphoric acid ($H_3PO_4$), ammonium dihydrogen phosphate ($NH_4H_2PO_4$), diammonium hydrogen phosphate (($NH_4)_2HPO_4$); and water are mixed, thereby producing a homogeneous slurry-form mixture.

Next, the slurry-form mixture is hydrothermally synthesized using a pressure-resistant closed container, and the obtained sediment was washed using water, thereby generating a cake-form precursor substance. The hydrothermal synthesis conditions can be arbitrarily selected, and, for example, a temperature in a range of 130° C. to 250° C. is preferred, and a time in a range of 1 hour to 15 hours is preferred.

Next, the precursor substance and an arbitrarily selected organic compound are dissolved or dispersed in a solvent, thereby producing a homogeneous slurry. During the dissolution or dispersion, a dispersant may be added.

Examples of the organic compound include polyvinyl alcohols, polyvinylpyrrolidone, cellulose, starch, gelatin, carboxymethyl cellulose, methyl cellulose, hydroxymethyl cellulose, hydroxyethyl cellulose, polyacrylic acid, polystyrene sulfonic acid, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyether and multivalent alcohols.

Examples of the multivalent alcohols include polyethylene glycol, polypropylene glycol, polyglycerine, glycerin and the like.

The solvent in which the precursor substance and the organic compound are dissolved or dispersed can be arbitrarily selected, and, for example, water is preferred. In addition to water, examples of the solvent include alcohols such as methanol, ethanol, 1-propanol, 2-propanol (isopropyl alcohol: IPA), butanol, pentanol, hexanol, octanol and diacetone alcohol; esters such as ethyl acetate, butyl acetate, ethyl lactate, propylene glycol monomethyl ether acetate, propylene glycol monoethyl ether acetate and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether; ketones such as acetone, methyl ethyl ketone (MEK), methyl isobutyl ketone (MIBK), acetyl acetone and cyclohexanone; amides such as dimethyl formamide, N,N-dimethylacetoacetamide and N-methylpyrrolidone; and glycols such as ethylene glycol, diethylene glycol and propylene glycol. The above-described solvent may be solely used, or a mixture of two or more solvents may be used.

Regarding a blending ratio between the precursor substance and the organic compound when the total mass of the organic compound is converted into the amount of carbon, the amount of carbon is preferably in a range of 0.6 parts by mass to 10 parts by mass, preferably in a range of 0.7 parts by mass to 7 parts by mass, and still more preferably in a range of 0.8 parts by mass to 4.0 parts by mass with respect to 100 parts by mass of the precursor substance (solid content).

Here, when the blending ratio of the organic compound in terms of the amount of carbon is less than 0.6 parts by mass, the coating ratio of a carbonaceous coat generated by thermally treating the organic compound on the surfaces of the $Li_xA_yD_zPO_4$ particles is less than 80%. Therefore, the discharge capacity decreases at a high-speed charging and discharging rate in a formed battery, and it becomes difficult to realize sufficient charging and discharging rate performance. On the other hand, when the blending ratio of the organic compound in terms of the amount of carbon exceeds 10 parts by mass, relatively, the blending ratio of the $Li_xA_yD_zPO_4$ particles decreases. Therefore, the capacity of a battery becomes low in a case in which a battery is formed, and the bulk density of the $Li_xA_yD_zPO_4$ particles becomes large due to the excessive support of the carbonaceous coat. Therefore, the density of the electrode decreases, and a decrease in the battery capacitance of a lithium ion battery per unit volume becomes considerable.

A method for dissolving or dispersing the precursor substance and the organic compound in the solvent is not particularly limited as long as the precursor substance is uniformly dispersed and the organic compound is dissolved or dispersed with the method. For example, a preferred method is the use of a media stirring dispersion apparatus in which medium particles are stirred at a high speed such as a planetary ball mill, a vibration ball mill, a beads mill, a paint shaker or an attritor.

During the dissolution or dispersion, it is preferable to disperse the precursor substance as a primary particle and then dissolve the organic compound through stirring. Then, the surfaces of the primary particles of the precursor substance are coated with the organic compound. As a result, carbon derived from the organic compound is uniformly adhered to the surfaces of the primary particles of the precursor substance.

Next, the above-described homogeneous slurry is sprayed and dried in a high-temperature atmosphere using a spray-pyrolysis method, thereby producing dried particles or granulated bodies.

Here, in a case in which it is necessary to obtain dried particles, that is, surface-coated $Li_xA_yD_zPO_4$ particles, the above-described homogeneous slurry is sprayed and dried in a high-temperature atmosphere, for example, an atmosphere at a temperature in a range of 100° C. to 300° C., and more preferably in a range of 110° C. to 200° C.

Next, the dried particles or granulated bodies are fired in a non-oxidizing atmosphere at a temperature in a range of 650° C. to 1100° C., preferably in a range of 700° C. to 1000° C., preferably in a range of 750° C. to 950° C., and still more preferably in a range of 800° C. to 900° C.

The non-oxidizing atmosphere can be arbitrarily selected as long as the object is procured, and, for example, an inert atmosphere filled with an inert gas such as nitrogen ($N_2$) or argon (Ar) is preferred. In a case in which it is necessary to further suppress oxidization, a reducing atmosphere containing a reducing gas such as hydrogen ($H_2$) is preferred. A reducing gas may be mixed with an inert gas as necessary.

Here, the reason for setting a firing temperature in a range of 700° C. to 1000° C. is that, when the firing temperature is lower than 700° C., the decomposition and reaction of the organic compound contained in the dried particles or granulated bodies do not proceed sufficiently. Therefore, the organic compound does not sufficiently carbonize, and the product of the decomposition and reaction becomes a decomposed organic substance having a high resistance, which is not preferable. On the other hand, when the firing temperature exceeds 1000° C., the component configuring the dried particles or granulated bodies, for example, lithium (Li) is evaporated so as to cause composition deviation. Additionally, the dried particles or granulated bodies promote grain growth, the discharge capacity at a high-speed charging and discharging rate becomes low, and it becomes difficult to realize sufficient charging and discharging rate performance.

The firing time is not particularly limited as long as the organic compound is sufficiently carbonized during the time, and is set in a range of 0.1 hours to 10 hours.

In the firing step, the precursor substance in the dried particles turns into $Li_xA_yD_zPO_4$ particles. On the other hand, the organic compound is decomposed and reacted during a thermal treatment so as to generate carbon, and the carbon is adhered to the surfaces of the $Li_xA_yD_zPO_4$ particles so as to form a carbonaceous coat. Then, the surfaces of the $Li_xA_yD_zPO_4$ particles are coated with the carbonaceous coat, thereby generating surface-coated $Li_xA_yD_zPO_4$ particles.

Similarly, the precursor substance in the granulated bodies turns into $Li_xA_yD_zPO_4$ particles. On the other hand, the organic compound is decomposed and reacted during a thermal treatment so as to generate carbon, and the carbon is adhered to the surfaces of the $Li_xA_yD_zPO_4$ particles so as to form a carbonaceous coat. Then, the surfaces of the $Li_xA_yD_zPO_4$ particles are coated with the carbonaceous coat.

In the granulated bodies, a plurality of the surface-coated $Li_xA_yD_zPO_4$ particles having surfaces coated with the carbonaceous coat is generated. Therefore, during the firing step, the surface-coated $Li_xA_yD_zPO_4$ particles agglomerate together, and agglomerated particles in which a plurality of the surface-coated $Li_xA_yD_zPO_4$ particles is agglomerated are generated.

In the firing step, in a case in which the dried particles or granulated bodies contain lithium, lithium diffuses into the carbonaceous coat and is thus present in the carbonaceous coat as the firing time increases, and the conducting property of the carbonaceous coat further improves, which is preferable. That is, in the invention, the carbonaceous coat may be any one of a film including only carbon, a film including carbon and lithium, and a film including carbon, lithium and other elements.

However, when the firing time becomes too long, abnormal grain growth occurs, and surface-coated $Li_xA_yD_zPO_4$ particles or agglomerated particles in which lithium is partially absent are generated. Therefore, the performance of the surface-coated $Li_xA_yD_zPO_4$ particles or agglomerated particles degrades. As a result, battery characteristics obtained using the surface-coated $Li_xA_yD_zPO_4$ particles or agglomerated particles degrade, which is not preferable.

The surface-coated $Li_xA_yD_zPO_4$ particles or agglomerated particles obtained in the above-described manner are thermally treated in a non-oxidizing atmosphere at a temperature, for example, in a range of 35° C. to 550° C., preferably in a range of 40° C. to 500° C., and more preferably in a range of 80° C. to 400° C. for, for example, 0.1 hours to 1000 hours, preferably 0.5 hours to 300 hours, and more preferably 0.5 hours to 200 hours.

Here, the reason for setting the thermal treatment conditions in the above-described ranges is that the thermal treatment under the conditions in the above-described ranges supplies heat energy that is equal to or higher than room temperature so that Li and P contained in the dried particles or granulated bodies elute from the inside of the particles, and the eluted Li and P coat carbonaceous surfaces formed on the above-described particle surfaces and/or particle surfaces that are the interfaces between the particle surfaces and the carbonaceous coat, whereby it is possible to suppress the elution of A element, particularly, the elution of a major element of Fe from the particles.

Then, it is possible to obtain surface-coated $Li_xA_yD_zPO_4$ particles having a desired average particle diameter or agglomerated particles obtained by agglomerating a plurality of the surface-coated $Li_xA_yD_zPO_4$ particles.

[Electrode Plate]

An electrode plate of the embodiment includes a positive electrode material layer containing the electrode material of the embodiment formed on one surface of a collector such as a metal foil. The collector of the invention can be arbitrarily selected, and specific examples of the collector that can be preferably used include a carbon coated film electrode, a plane electrode, an acid treatment-etched electrode and the like.

The electrode plate is used as a positive electrode in a lithium ion battery, and the electrode plate can be produced by forming a positive electrode material layer containing the electrode material of the embodiment on the collector, and then thermally treating the electrode plate including the positive electrode material layer formed on the collector in a non-oxidizing atmosphere at a temperature in a range of 40° C. to 500° C. and preferably in a range of 80° C. to 300° C. for 0.05 hours to 1000 hours, and preferably for 0.1 hours to 1 hour.

The manufacturing method for the electrode plate will be described in detail.

The electrode material including any one of the above-described (1) and (2), a binding agent including a binder resin and a solvent are mixed, thereby adjusting paint for electrode formation or paste for electrode formation. At this time, a conduction aid such as carbon black may be added as necessary.

The binding agent, that is, the binder resin can be arbitrarily selected, and, for example, a polytetrafluoroethylene (PTFE) resin, a polyvinylidene fluoride (PVdF) resin, fluorine-containing rubber or the like is preferably used.

The blending ratio between the above-described electrode material and the binder resin is not particularly limited. For example, the amount of the binder resin is set in a range of 1 part by mass to 30 parts by mass, preferably in a range of 2 parts by mass to 25 parts by mass, and more preferably in a range of 3 parts by mass to 20 parts by mass with respect to 100 parts by mass of the electrode material.

The solvent used for the paint for electrode formation or paste for electrode formation can be arbitrarily selected. Examples of the solvent include water; alcohols such as methanol, ethanol, 1-propanol, 2-propanol (isopropyl alcohol: IPA), butanol, pentanol, hexanol, octanol and diacetone alcohol; esters such as ethyl acetate, butyl acetate, ethyl lactate, propylene glycol monomethyl ether acetate, propylene glycol monoethyl ether acetate and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether and diethylene glycol monoethyl ether; ketones such as acetone, methyl ethyl ketone (MEK), methyl isobutyl ketone (MIBK), acetyl acetone and cyclohexanone; amides such as dimethyl formamide, N,N-dimethylacetoacetamide and N-methylpyrrolidone; glycols such as ethylene glycol, diethylene glycol and propylene glycol. The above-described solvent may be solely used, or a mixture of two or more solvents may be used.

Next, the paint for electrode formation or paste for electrode formation is applied onto one surface of a metal foil. After that, the paint for electrode formation or paste for electrode formation is dried to remove the solvent, and a metal foil including a coated film including a mixture of the above-described electrode material and the binder resin and formed on a surface is obtained.

Next, the coated film is pressurized, compressed and dried, thereby obtaining an electrode plate including a positive electrode material layer containing the electrode material formed on the collector.

Meanwhile, the location or range in which the paste is applied can be arbitrarily selected. For example, the coated part on the electrode plate manufactured in the example has a length a of 30 mm and a width b of 25 mm.

Next, the electrode plate having the positive electrode material layer formed on the collector is thermally treated in a non-oxidizing atmosphere at a temperature in a range of 40° C. to 500° C. for 0.1 hours to 1000 hours. The thermal treatment conditions are the same as the thermal treatment conditions in the manufacturing method for the above-described electrode material. The preferable thickness of the dried coated film can be arbitrarily selected, but is preferably in a range of 15 µm to 300 µm, and more preferably in a range of 60 µm to 150 µm. The film thickness can be measured using a micro gauge. Then, it is possible to produce the electrode plate of the embodiment.

In the electrode plate, it is possible to improve the electron conductivity of the positive electrode material layer.

[Lithium Ion Battery]

The lithium ion battery of the embodiment is a battery in which the electrode plate of the embodiment is used as the positive electrode.

The lithium ion battery includes the electrode plate (positive electrode) of the embodiment, a negative electrode and an electrolytic solution. For example, the lithium ion battery of the invention may have a structure illustrated in FIGS. 3 and 4.

The negative electrode is obtained, for example, in the following manner. Graphite powder, a binding agent including a binder resin, a solvent and a conduction aid such as carbon black, if necessary, are mixed. The obtained paint for electrode formation or paste for electrode formation is applied to one surface of a metal foil. After that, the paint or paste is dried, a metal foil including a coated film including a mixture of the above-described electrode material and the binder resin and formed on a surface is obtained, the coated film is pressurized, compressed and dried, thereby forming an electrode including a negative electrode material layer containing the electrode material formed on the metal foil.

The electrolytic solution can be arbitrarily selected, and the electrolytic solution can be produced by, for example, mixing ethylene carbonate (EC) and ethyl methyl carbonate (EMC) so that the volume ratio becomes 1:1, and dissolving lithium hexafluorophosphate ($LiPF_6$) in the obtained solvent mixture so that the concentration becomes, for example, 1 mole/$dm^3$.

In the lithium ion battery of the embodiment, since the electrode plate of the embodiment is used as the positive electrode, the elimination and insertion of Li become favorable, and therefore stable charging and discharging cycle characteristics or high stability can be realized.

As described above, according to the electrode material of the embodiment, since the elution amount of Li is made to be in a range of 200 ppm to 700 ppm and the elution amount of P is made to be in a range of 500 ppm to 2000 ppm when the surface-coated $Li_xA_yD_zPO_4$ particles obtained by coating the surfaces of $Li_xA_yD_zPO_4$ with a carbonaceous coat or the agglomerated particles obtained by agglomerating a plurality of the surface-coated $Li_xA_yD_zPO_4$ particles are immersed in a sulfuric acid solution having a hydrogen-ion exponent of 4 for 24 hours, it is possible to suppress the elution of a metal impurity, particularly, the elution of a major element of Fe.

Therefore, when an electrode plate for a lithium ion battery is produced using the electrode material, the elimination and insertion of Li in the lithium ion battery become favorable. Therefore, it is possible to improve the durability of the lithium ion battery.

According to the manufacturing method for an electrode material of the embodiment, since any one of the surface-coated $Li_xA_yD_zPO_4$ particles and the agglomerated particles obtained by agglomerating a plurality of the surface-coated $Li_xA_yD_zPO_4$ particles are thermally treated in a non-oxidizing atmosphere at a temperature in a range of 40° C. to 500° C. over 0.1 hours to 1000 hours, it is possible to easily produce an electrode material capable of suppressing the elution of a metal impurity, particularly, the elution of the major element of Fe.

According to the manufacturing method for an electrode plate of the embodiment, the positive electrode material layer containing any one of the surface-coated $Li_xA_yD_zPO_4$ particles and the agglomerated particles obtained by agglomerating a plurality of the surface-coated $Li_xA_yD_zPO_4$ particles is formed on a collector. Next, an electrode plate having the positive electrode material layer formed on the collector is thermally treated in a non-oxidizing atmosphere at a temperature in a range of 40° C. to 500° C. over 0.1 hours to 1000 hours. Therefore, it is possible to easily produce an electrode plate capable of suppressing the elution of a metal impurity, particularly, the elution of the major element of Fe. Therefore, it is possible to improve the durability of a lithium ion battery by producing the lithium ion battery using the electrode plate.

Meanwhile, in the invention, the term "plurality" means an arbitrary number that is at least two.

EXAMPLES

Hereinafter, the invention will be specifically described using examples and comparative examples, but the invention is not limited by the above-described examples.

Example 1

Production of an Electrode Material 4 mol of lithium acetate ($LiCH_3COO$), 2 mol of iron (II) sulfate ($FeSO_4$) and 2 mol of phosphoric acid ($H_3PO_4$) were mixed with 2 L (liters) of water so that the total amount reached 4 L, thereby preparing a homogeneous slurry-form mixture.

Next, the mixture was contained in a pressure-resistant closed container having a capacity of 8 L, and hydrothermally synthesized at 120° C. for 1 hour.

Next, the obtained sediment was washed using water, and a cake-form precursor of an electrode-active material was obtained.

Next, 60 g of the precursor of the electrode-active material (in terms of solid content), 3 g of polyethylene glycol as the organic compound, and 60 g of water as the solvent were dispersed for 12 hours using a ball mill and 500 g of zirconia balls having a diameter of 5 mm as medium particles, thereby adjusting a homogeneous slurry.

Next, the slurry was sprayed in the atmosphere at 180° C., and dried, thereby obtaining $LiFePO_4$ particles having surfaces coated with polyethylene glycol.

Next, the $LiFePO_4$ particles having the surfaces coated with polyethylene glycol were fed into a carbon sagger (koubachi), fired in a nitrogen ($N_2$) atmosphere at 700° C. for 1 hour, thereby obtaining surface-coated $LiFePO_4$ particles having surfaces coated with a carbonaceous coat.

Next, the surface-coated $LiFePO_4$ particles were thermally treated in the atmosphere at 40° C. for 0.5 hours, thereby obtaining an electrode material (A1) of Example 1 including the surface-coated $LiFePO_4$ particles having an average particle diameter of 85 nm.

(Evaluation of the Electrode Material)

As a result of observing the electrode material (A1) using a scanning electron microscope (SEM) and a transmission electron microscope (TEM), it was observed that the surfaces of $LiFePO_4$ particles were coated with a carbon thin film (FIG. 1).

3 g of the electrode material (A1) was immersed in 30 g of a sulfuric acid solution having a pH of 4 at 25° C. for 24 hours, then, the solid and the liquid were separated, and the elusion amount of Fe, the elution amount of Li and the elution amount of P in the obtained solution were measured using an ICP analyzer (manufactured by Seiko Instruments Inc.).

As a result of the measurement, the elution amount of Fe eluted into the sulfuric acid solution from the electrode material (A1) was 62 ppm, the elution amount of Li was 415 ppm, and the elution amount of P was 1221 ppm.

In addition, as a result of measuring the pH of the solution, the pH was 8.4.

(Production of a Lithium Ion Battery)

The above-described electrode material (A1), polyvinylidene fluoride (PVdF) (trade name: KFL-7305) as a binder and acetylene black (AB) (trade name: DENKA BLACK) as a conduction aid were mixed so that the mass ratio became 90:5:5, and furthermore, N-methyl-2-pyrrolidinone (NMP) was added as a solvent so as to supply fluidity, thereby producing a slurry.

Next, the slurry was applied onto a 15 μm-thick aluminum (Al) foil so that the thickness of a dried film became 150 μm, and dried. After that, the slurry was pressurized with a pressure of 600 $kgf/cm^2$, an electrode plate for a lithium ion battery of Example 1 was produced, and used as a positive electrode.

Figure 2:
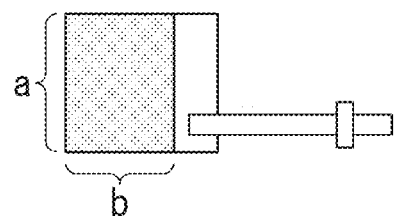
FIG. 2 is a schematic side view illustrating an example of a positive electrode of a lithium ion battery of the invention.
Figure 3:
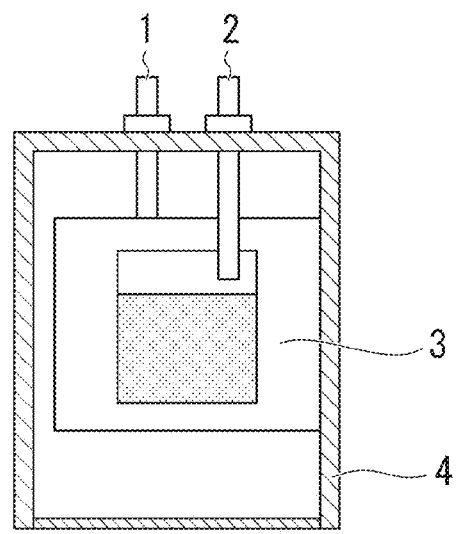
FIG. 3 is a schematic cross-sectional view illustrating an example of the lithium ion battery of the invention.
Figure 4:
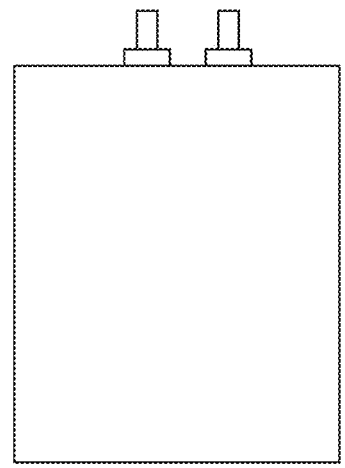
FIG. 4 is a schematic side view illustrating an example of the lithium ion battery of the invention.

Lithium metal was disposed as a negative electrode 2 against the positive electrode 1 of the lithium ion battery, and a separator 3 including porous polypropylene was disposed between the positive electrode and the negative electrode, thereby producing a member for a battery (FIGS. 2, 3 and 4). The coated part on the electrode plate manufactured in the example had a length a of 30 mm and a width b of 25 mm.

Meanwhile, ethylene carbonate and diethyl carbonate were mixed at a mass ratio of 1:1, and 1 M of a $LiPF_6$ solution was further added, thereby producing an electrolyte solution having lithium ion conductivity.

Next, the member for a battery was immersed in the above-described electrolyte solution, thereby producing the lithium ion battery of Example 1.

(Evaluation of the Lithium Ion Battery)

The charging and discharging characteristics of the lithium ion battery were evaluated.

Here, on the above-described lithium ion battery, constant current charging was carried out at 60° C. with a current value of 1 C until the charging voltage reached 4.2 V, then, the constant current charging was switched into constant voltage charging, and the charging was ended when the current value reached 0.01 C. After that, discharging was carried out with a discharging current of 1 C, and the discharging was ended when the battery voltage reached 2.5 V. The discharge capacity was measured at this time, and was considered as the initial capacity. In addition, charging and discharging were repeated under the same conditions, the discharge capacity at the $300^{th}$ cycle was measured, and the discharge capacity retention ratio with respect to the initial capacity was computed.

As a result, the initial capacity was 8.65 mAh, and the discharge capacity maintenance ratio was 830.

Example 2

Production of an Electrode Material

Surface-coated $LiFePO_4$ particles were obtained according to Example 1.

Next, the surface-coated $LiFePO_4$ particles were thermally treated in the atmosphere at 40° C. for 200 hours, thereby obtaining an electrode material (A2) of Example 2 including the surface-coated $LiFePO_4$ particles having an average particle diameter of 88 nm.

(Evaluation of the Electrode Material)

As a result of measuring the elution amount of Fe, the elution amount of Li, and the elution amount of Pin the electrode material (A2) according to Example 1, the elution amount of Fe eluted into the sulfuric acid solution from the electrode material (A2) was 25 ppm, the elution amount of Li was 432 ppm, and the elution amount of P was 1352 ppm.

In addition, as a result of measuring the pH of the solid-liquid separated solution, the pH was 8.9.

(Production and Evaluation of a Lithium Ion Battery)

A lithium ion battery of Example 2 was produced using the above-described electrode material (A2) according to Example 1, and evaluated.

As a result, the initial capacity was 8.95 mAh, and the discharge capacity retention ratio was 89%.

Example 3

Production of an Electrode Material 4 mol of lithium acetate ($LiCH_3COO$), 2 mol of manganese (II) sulfate ($MnSO_4$) and 2 mol of phosphoric acid ($H_3PO_4$) were mixed with 2 L (liters) of water so that the total amount reached 4 L, thereby preparing a homogeneous slurry-form mixture.

Next, the mixture was contained in a pressure-resistant closed container having a capacity of 8 L, and hydrothermally synthesized at 110° C. for 1 hour.

Next, the obtained sediment was washed using water, and a cake-form precursor of an electrode-active material was obtained.

Next, 150 g of the precursor of the electrode-active material (in terms of solid content), 5.5 g of polyethylene glycol as the organic compound, and 60 g of water as the solvent were dispersed for 12 hours using a ball mill and 500 g of zirconia balls having a diameter of 5 mm as medium particles, thereby adjusting a homogeneous slurry.

Next, the slurry was sprayed in the atmosphere at 180° C., and dried, thereby obtaining $LiMnPO_4$ particles having surfaces coated with polyethylene glycol.

Next, the $LiMnPO_4$ particles having the surfaces coated with polyethylene glycol were fired in a nitrogen ($N_2$) atmosphere at 700° C. for 1 hour, thereby obtaining surface-coated $LiMnPO_4$ particles having surfaces coated with a carbonaceous coat.

Next, the surface-coated $LiMnPO_4$ particles were thermally treated in the atmosphere at 40° C. for 0.5 hours, thereby obtaining an electrode material (A3) of Example 3 including the surface-coated $LiMnPO_4$ particles having an average particle diameter of 35 nm.

(Evaluation of the Electrode Material)

As a result of measuring the elution amount of Mn, the elution amount of Li, and the elution amount of P in the electrode material (A3) according to Example 1, the elution amount of Mn eluted into the sulfuric acid solution from the electrode material (A3) was 82 ppm, the elution amount of Li was 621 ppm, and the elution amount of P was 1652 ppm. In addition, as a result of measuring the pH of the solid-liquid separated solution, the pH was 8.3.

(Production and Evaluation of a Lithium Ion Battery)

A lithium ion battery of Example 3 was produced using the above-described electrode material (A3) according to Example 1, and evaluated.

As a result, the initial capacity was 8.29 mAh, and the discharge capacity retention ratio was 87%.

Example 4

Production of an Electrode Material

A cake-form precursor of an electrode-active material was obtained according to Example 1.

Next, 150 g of the precursor of the electrode-active material (in terms of solid content), 5.5 g of polyethylene glycol as the organic compound, and 60 g of water as the solvent were dispersed for 12 hours using a ball mill and 500 g of zirconia balls having a diameter of 5 mm as medium particles, thereby adjusting a homogeneous slurry.

Next, the slurry was sprayed in the atmosphere at 180° C., and dried, thereby obtaining granulated bodies containing a plurality of $LiFePO_4$ particles having surfaces coated with polyethylene glycol.

Next, the granulated bodies were fired in a nitrogen ($N_2$) atmosphere at 700° C. for 1 hour, thereby obtaining agglomerated particles in which a plurality of surface-coated $LiFePO_4$ particles having surfaces coated with a carbonaceous coat was agglomerated.

Next, the agglomerated particles were thermally treated in the atmosphere at 40° C. for 0.5 hours, thereby obtaining an electrode material (A4) of Example 4 including agglomerated particles having an average particle diameter of 6 μm.

(Evaluation of the Electrode Material)

As a result of observing the electrode material (A4) using a scanning electron microscope (SEM) and a transmission electron microscope (TEM), it was observed that a plurality of primary particles ($LiFePO_4$ particles) was agglomerated so as to produce secondary particles, the surfaces of the primary particles ($LiFePO_4$ particles) were coated with a carbon thin film, and a carbonaceous coat was interposed between the primary particles ($LiFePO_4$ particles).

As a result of measuring the elution amount of Fe, the elution amount of Li, and the elution amount of P in the electrode material (A4) according to Example 1, the elution amount of Fe eluted into the sulfuric acid solution from the electrode material (A4) was 58 ppm, the elution amount of Li was 450 ppm, and the elution amount of P was 1250 ppm. In addition, as a result of measuring the pH of the solid-liquid separated solution, the pH was 8.5.

(Production and Evaluation of a Lithium Ion Battery)

A lithium ion battery of Example 4 was produced using the above-described electrode material (A4) according to Example 1, and evaluated.

As a result, the initial capacity was 8.75 mAh, and the discharge capacity retention ratio was 85%.

Example 5

Production of an Electrode Material

Agglomerated particles were obtained according to Example 4.

Next, the agglomerated particles were thermally treated in the atmosphere at 200° C. for 0.5 hours, thereby obtaining an electrode material (A5) of Example 5 including agglomerated particles having an average particle diameter of 11.4 μm.

(Evaluation of the Electrode Material)

As a result of measuring the elution amount of Fe, the elution amount of Li, and the elution amount of P in the electrode material (A5) according to Example 1, the elution amount of Fe eluted into the sulfuric acid solution from the electrode material (A5) was 20 ppm, the elution amount of Li was 520 ppm, and the elution amount of P was 1340 ppm. In addition, as a result of measuring the pH of the solid-liquid separated solution, the pH was 8.6.

(Production and Evaluation of a Lithium Ion Battery)

A lithium ion battery of Example 5 was produced using the above-described electrode material (A5) according to Example 1, and evaluated.

As a result, the initial capacity was 8.68 mAh, and the discharge capacity retention ratio was 86%.

Example 6

Production of an Electrode Material

Agglomerated particles were obtained according to Example 4.

Next, the agglomerated particles were thermally treated in the atmosphere at 500° C. for 0.5 hours, thereby obtaining an electrode material (A6) of Example 6 including agglomerated particles having an average particle diameter of 10.9 μm.

(Evaluation of the Electrode Material)

As a result of measuring the elution amount of Fe, the elution amount of Li, and the elution amount of P in the electrode material (A6) according to Example 1, the elution amount of Fe eluted into the sulfuric acid solution from the electrode material (A6) was 12 ppm, the elution amount of Li was 495 ppm, and the elution amount of P was 1290 ppm. In addition, as a result of measuring the pH of the solid-liquid separated solution, the pH was 8.6.

(Production and Evaluation of a Lithium Ion Battery)

A lithium ion battery of Example 6 was produced using the above-described electrode material (A6) according to Example 1, and evaluated.

As a result, the initial capacity was 8.96 mAh, and the discharge capacity retention ratio was 890.

Example 7

Production of an Electrode Material

Agglomerated particles were obtained according to Example 4.

Next, the agglomerated particles were thermally treated in the atmosphere at 40° C. for 24 hours, thereby obtaining an electrode material (A7) of Example 7 including agglomerated particles having an average particle diameter of 10.7 µm.

(Evaluation of the Electrode Material)

As a result of measuring the elution amount of Fe, the elution amount of Li, and the elution amount of P in the electrode material (A7) according to Example 1, the elution amount of Fe eluted into the sulfuric acid solution from the electrode material (A7) was 35 ppm, the elution amount of Li was 525 ppm, and the elution amount of P was 1320 ppm. In addition, as a result of measuring the pH of the solid-liquid separated solution, the pH was 8.7.

(Production and Evaluation of a Lithium Ion Battery)

A lithium ion battery of Example 7 was produced using the above-described electrode material (A7) according to Example 1, and evaluated.

As a result, the initial capacity was 8.61 mAh, and the discharge capacity retention ratio was 87%.

Example 8

Production of an Electrode Material

Agglomerated particles were obtained according to Example 4.

Next, the agglomerated particles were thermally treated in the atmosphere at 40° C. for 200 hours, thereby obtaining an electrode material (A8) of Example 8 including agglomerated particles having an average particle diameter of 10.8 µm.

(Evaluation of the Electrode Material)

As a result of measuring the elution amount of Fe, the elution amount of Li, and the elution amount of P in the electrode material (A8) according to Example 1, the elution amount of Fe eluted into the sulfuric acid solution from the electrode material (A8) was 24 ppm, the elution amount of Li was 556 ppm, and the elution amount of P was 1450 ppm. In addition, as a result of measuring the pH of the solid-liquid separated solution, the pH was 8.8.

(Production and Evaluation of a Lithium Ion Battery)

A lithium ion battery of Example 8 was produced using the above-described electrode material (A8) according to Example 1, and evaluated.

As a result, the initial capacity was 8.47 mAh, and the discharge capacity retention ratio was 90%.

Example 9

Production of an Electrode Material

Agglomerated particles were obtained according to Example 4.

Next, the agglomerated particles were thermally treated in the atmosphere at 500° C. for 200 hours, thereby obtaining an electrode material (A9) of Example 9 including agglomerated particles having an average particle diameter of 10.4 µm.

(Evaluation of the Electrode Material)

As a result of measuring the elution amount of Fe, the elution amount of Li, and the elution amount of P in the electrode material (A9) according to Example 1, the elution amount of Fe eluted into the sulfuric acid solution from the electrode material (A9) was 9 ppm, the elution amount of Li was 528 ppm, and the elution amount of P was 1390 ppm. In addition, as a result of measuring the pH of the solid-liquid separated solution, the pH was 8.7.

(Production and Evaluation of a Lithium Ion Battery)

A lithium ion battery of Example 9 was produced using the above-described electrode material (A9) according to Example 1, and evaluated.

As a result, the initial capacity was 8.54 mAh, and the discharge capacity retention ratio was 89%.

Example 10

Production of an Electrode Plate

Agglomerated particles in which a plurality of surface-coated $LiFePO_4$ particles was agglomerated were obtained according to Example 4. Next, an electrode plate was produced according to Example 1 using the agglomerated particles.

Next, the electrode plate was thermally treated in the atmosphere at 120° C. for 0.5 hours, thereby obtaining an electrode plate (B1) of Example 10.

The positive electrode material layer was cut out of the electrode plate (B1), thereby producing an electrode material (A10) of Example 10.

(Evaluation of the Electrode Plate)

As a result of measuring the elution amount of Fe, the elution amount of Li, and the elution amount of P in the electrode material (A10) according to Example 1, the elution amount of Fe eluted into the sulfuric acid solution from the electrode material (A10) was 22 ppm, the elution amount of Li was 487 ppm, and the elution amount of P was 1298 ppm. In addition, as a result of measuring the pH of the solid-liquid separated solution, the pH was 8.9.

(Production and Evaluation of a Lithium Ion Battery)

A lithium ion battery of Example 10 was produced using the above-described electrode material (A10) according to Example 1, and evaluated.

As a result, the initial capacity was 8.69 mAh, and the discharge capacity retention ratio was 86%.

Example 11

Production of an Electrode Material

A cake-form precursor of an electrode-active material was obtained according to Example 3.

Next, 150 g of the precursor of the electrode-active material (in terms of solid content), 5.5 g of polyethylene glycol as the organic compound, and 60 g of water as the solvent were dispersed for 12 hours using a ball mill and 500 g of zirconia balls having a diameter of 5 mm as medium particles, thereby adjusting a homogeneous slurry.

Next, the slurry was sprayed in the atmosphere at 180° C., and dried, thereby obtaining granulated bodies containing a plurality of $LiMnPO_4$ particles having surfaces coated with polyethylene glycol.

Next, the granulated bodies were fired in a nitrogen (N$_2$) atmosphere at 700° C. for 1 hour, thereby obtaining agglomerated particles in which a plurality of surface-coated LiMnPO$_4$ particles having surfaces coated with a carbonaceous coat was agglomerated.

Next, the agglomerated particles were thermally treated in the atmosphere at 40° C. for 0.5 hours, thereby obtaining an electrode material (C1) of Example 11 including agglomerated particles having an average particle diameter of 10.5 µm.

(Evaluation of the Electrode Material)

As a result of observing the electrode material (C1) using a scanning electron microscope (SEM) and a transmission electron microscope (TEM), it was observed that a plurality of primary particles (LiMnPO$_4$ particles) was agglomerated so as to produce secondary particles, the surfaces of the primary particles (LiMnPO$_4$ particles) were coated with a carbon thin film, and a carbonaceous coat was interposed between the primary particles (LiMnPO$_4$ particles) (FIG. 1).

As a result of measuring the elution amount of Mn, the elution amount of Li, and the elution amount of P in the electrode material (C1) according to Example 1, the elution amount of Mn eluted into the sulfuric acid solution from the electrode material (C1) was 74 ppm, the elution amount of Li was 643 ppm, and the elution amount of P was 1621 ppm. In addition, as a result of measuring the pH of the solid-liquid separated solution, the pH was 8.1.

(Production and Evaluation of a Lithium Ion Battery)

A lithium ion battery of Example 11 was produced using the above-described electrode material (C1) according to Example 1, and evaluated.

As a result, the initial capacity was 8.26 mAh, and the discharge capacity retention ratio was 88%.

Comparative Example 1

Production of an Electrode Material

Agglomerated particles in which a plurality of surface-coated LiFePO$_4$ particles was agglomerated were obtained according to Example 4, and were used as an electrode material (D1) of Comparative Example 1 without thermally treating the agglomerated particles.

(Evaluation of the Electrode Material)

As a result of measuring the elution amount of Fe, the elution amount of Li, and the elution amount of P in the electrode material (D1) according to Example 1, the elution amount of Fe eluted into the sulfuric acid solution from the electrode material (D1) was 250 ppm, the elution amount of Li was 125 ppm, and the elution amount of P was 425 ppm. In addition, as a result of measuring the pH of the solid-liquid separated solution, the pH was 6.8.

(Production and Evaluation of a Lithium Ion Battery)

A lithium ion battery of Comparative Example 1 was produced using the above-described electrode material (D1) according to Example 1, and evaluated.

As a result, the initial capacity was 8.31 mAh, and the discharge capacity retention ratio was 65%.

Comparative Example 2

Production of an Electrode Material

Agglomerated particles in which a plurality of surface-coated LiMnPO$_4$ particles was agglomerated were obtained according to Example 11, and were used as an electrode material (E1) of Comparative Example 2 without thermally treating the agglomerated particles.

(Evaluation of the Electrode Material)

As a result of measuring the elution amount of Mn, the elution amount of Li, and the elution amount of P in the electrode material (E1) according to Example 1, the elution amount of Mn eluted into the sulfuric acid solution from the electrode material (E1) was 412 ppm, the elution amount of Li was 132 ppm, and the elution amount of P was 411 ppm. In addition, as a result of measuring the pH of the solid-liquid separated solution, the pH was 6.5.

(Production and Evaluation of a Lithium Ion Battery)

A lithium ion battery of Comparative Example 2 was produced using the above-described electrode material (E1) according to Example 1, and evaluated.

As a result, the initial capacity was 8.17 mAh, and the discharge capacity retention ratio was 57%.

The evaluation results of the respective examples and the respective comparative examples are described in Table 1.

TABLE 1

|  | Thermal treatment temperature (° C.) | Thermal treatment time (hours) | Elution amount of metal impurity | | Elution amount of Li (ppm) | Elution amount of P (ppm) | pH | Initial capacity (mAh) | discharge capacity retention ratio (%) |
|---|---|---|---|---|---|---|---|---|---|
|  |  |  | Element | elution amount (ppm) |  |  |  |  |  |
| Example 1 | 40 | 0.5 | Fe | 62 | 415 | 1221 | 8.4 | 8.65 | 83 |
| Example 2 | 40 | 200 | Fe | 25 | 432 | 1352 | 8.9 | 8.95 | 89 |
| Example 3 | 40 | 0.5 | Mn | 82 | 621 | 1652 | 8.3 | 8.29 | 87 |
| Example 4 | 40 | 0.5 | Fe | 58 | 450 | 1250 | 8.5 | 8.75 | 85 |
| Example 5 | 200 | 0.5 | Fe | 20 | 520 | 1340 | 8.6 | 8.68 | 86 |
| Example 6 | 500 | 0.5 | Fe | 12 | 495 | 1290 | 8.6 | 8.96 | 89 |
| Example 7 | 40 | 24 | Fe | 35 | 525 | 1320 | 8.7 | 8.61 | 87 |
| Example 8 | 40 | 200 | Fe | 24 | 556 | 1450 | 8.8 | 8.47 | 90 |
| Example 9 | 500 | 200 | Fe | 9 | 528 | 1390 | 8.7 | 8.54 | 89 |
| Example 10 | 120 | 0.5 | Fe | 22 | 487 | 1298 | 8.9 | 8.69 | 86 |
| Example 11 | 40 | 0.5 | Mn | 74 | 643 | 1621 | 8.1 | 8.26 | 88 |
| Comparative Example 1 | — | — | Fe | 250 | 125 | 425 | 6.8 | 8.31 | 65 |
| Comparative Example 2 | — | — | Mn | 412 | 132 | 411 | 6.5 | 8.17 | 57 |

According to the above-described results, in the electrode materials of Examples 1 to 11, a large amount of the compound including Li and P was adhered to the particle surfaces of the surface-coated particles or the agglomerated particles obtained by agglomerating a plurality of the above-described particles, the elution amount of Li eluted into the sulfuric acid solution from the electrode material was suppressed in a range of 200 ppm to 700 ppm, and the elution amount of P was suppressed in a range of 500 ppm to 2000 ppm, and consequently, it was found that the elution amount of Fe and the elution amount of Mn were favorably suppressed.

In addition, the capacity retention ratio at the $300^{th}$ cycle exceeded 85% when the lithium ion battery was charged and discharged cyclically in a 60° C. environment, and it was found that excellent charging and discharging cycle characteristics were exhibited.

The reason for the above is considered to be that the elution of Fe or the elution of Mn was suppressed during the cycle, and SEI breakage or the electro-crystallization of a Fe-based impurity or Mn-based impurity in the negative electrode was suppressed, and therefore the capacity deterioration was suppressed.

In addition, the pH of the solution reaching 8.1 to 8.9 after elution is considered to be because the concentration of hydrogen ions in the solution decreased, and a large amount of Li shifting toward an alkali side eluted.

On the other hand, in the electrode materials of Comparative Examples 1 and 2, the amount of the compound including Li and P adhered to the particle surfaces of the agglomerated particles became small, the elution amount of Li eluted into the sulfuric acid solution from the electrode material was 200 ppm or less, and the elution amount of P was 500 ppm or less. As a result, it was found that the suppression of the elution amount of Fe and the elution amount of Mn did not function well, the capacity retention ratio at the $300^{th}$ cycle dropped to 80% or less when the lithium ion battery was charged and discharged cyclically in a 60° C. environment, and the charging and discharging cycle characteristics significantly degraded.

The reason for the above is considered to be that the elution of Fe or the elution of Mn was not suppressed during the cycle, and the degree of SEI breakage or the electro-crystallization amount of a Fe-based impurity or Mn-based impurity in the negative electrode increased significantly, and therefore the capacity deterioration was significant.

In addition, the pH of the solution reaching 7.0 or less after elution is considered to be because, while the concentration of hydrogen ions in the solution decreased, the amount of Li shifting toward the alkali side was small.

According to the above-described results, it was found that, in the surface-coated $LiFePO_4$ particles and the agglomerated particles obtained by agglomerating a plurality of the surface-coated $LiMnPO_4$ particles, a certain amount or more of a compound including Li and P was adhered to the particles surfaces, and therefore the capacity deterioration was suppressed in a case in which the charging and discharging cycle was repeated in a high-temperature environment of 60° C., and it was possible to improve the charging and discharging cycle characteristics during the use of a secondary battery at a high temperature.

INDUSTRIAL APPLICABILITY

In the electrode material of the invention, the elution amount of Li is made to be in a range of 200 ppm to 700 ppm and the elution amount of P is made to be in a range of 500 ppm to 2000 ppm when surface-coated $Li_xA_yD_zPO_4$ particles obtained by coating the surfaces of $Li_xA_yD_zPO_4$ (here, A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\le2$, $0<y\le1$, and $0\le z\le1.5$) particles with a carbonaceous coat or agglomerated particles obtained by agglomerating a plurality of the surface-coated $Li_xA_yD_zPO_4$ particles are immersed in a sulfuric acid solution having a pH of 4 for 24 hours, and therefore it is possible to suppress the elution of a metal impurity, particularly, the elution of the major element of Fe or Mn from the above-described particles. Therefore, when an electrode plate for a lithium ion battery is manufactured using the above-described electrode material, the insertion and removal of Li in the lithium ion battery becomes favorable, and it is possible to improve the durability of the lithium ion battery. Therefore, the electrode material of the invention is capable not only of further improving the durability of a lithium ion battery, but also of being applied to a next-generation secondary battery for which a decrease in size and weight and an increase in the capacity are expected, and, in the case of the next-generation secondary battery, the effects are extremely large.

As described above, the invention provides an electrode material capable of realizing stable charging and discharging cycle characteristics and high durability by suppressing the elution of a metal impurity into an electrolytic solution or an aqueous solution, an electrode plate, a lithium ion battery, a manufacturing method for an electrode material, and a manufacturing method for an electrode plate.

REFERENCE SIGNS LIST a LENGTH OF ELECTRODE MATERIAL-APPLIED PART
b WIDTH OF ELECTRODE MATERIAL-APPLIED PART
1 NEGATIVE ELECTRODE
2 POSITIVE ELECTRODE
3 SEPARATOR
4 SEALED SECTION

We claim:
1. A manufacturing method for an electrode material,
   wherein any one of surface-coated $Li_xA_yD_zPO_4$ particles obtained by coating surfaces of $Li_xA_yD_zPO_4$ particles with a carbonaceous coat, wherein A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\le2$, $0<y\le1$, and $0\le z\le1.5$, and agglomerated particles obtained by agglomerating a plurality of the surface-coated $Li_xA_yD_zPO_4$ particles are thermally treated in a non-oxidizing atmosphere at a temperature in a range of 40° C. to 500° C. over 0.1 hours to 1000 hours,
   wherein an elution amount of Li is in a range of 200 ppm to 700 ppm and an elution amount of P is in a range of 500 ppm to 2000 ppm when the surface-coated $Li_xA_yD_zPO_4$ particles are immersed in a sulfuric acid solution having a hydrogen-ion exponent of 4 for 24 hours.
2. A manufacturing method for an electrode plate,
   wherein a positive electrode material layer containing any one of surface-coated $Li_xA_yD_zPO_4$ particles obtained by coating surfaces of $Li_xA_yD_zPO_4$ particles with a carbonaceous coat wherein A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$, and agglomerated particles obtained by agglomerating a plurality of the surface-coated $Li_xA_yD_zPO_4$ particles is formed on a collector, and then an electrode plate having the positive electrode material layer formed on the collector is thermally treated in a non-oxidizing atmosphere at a temperature in a range of 40° C. to 500° C. over 0.1 hours to 1000 hours, wherein an elution amount of Li is in a range of 200 ppm to 700 ppm and an elution amount of P is in a range of 500 ppm to 2000 ppm when the surface-coated $Li_xA_yD_zPO_4$ particles are immersed in a sulfuric acid solution having a hydrogen-ion exponent of 4 for 24 hours.

3. A manufacturing method for an electrode material comprising:

stirring surface-coated $Li_xA_yD_zPO_4$ particles, wherein A represents one or more selected from the group consisting of Co, Mn, Ni, Fe, Cu and Cr, D represents one or more selected from the group consisting of Mg, Ca, Sr, Ba, Ti, Zn, B, Al, Ga, In, Si, Ge, Sc, Y and rare earth elements, $0<x\leq2$, $0<y\leq1$, and $0\leq z\leq1.5$, with a carbonaceous coat in a sulfuric acid solution having a mass that is 10 times the mass of the particles and a pH of 4 at 25° C.;

immersing the surface-coated $Li_xA_yD_zPO_4$ particles at 25° C. for 24 hours; and measuring the elution amount of Li and the elution amount of P eluted from the surface-coated $Li_xA_yD_zPO_4$ particles into the sulfuric acid solution by inductively coupled plasma spectrometry after the 24 hours.

\* \* \* \* \*